Jan. 3, 1933.  A. E. BRONSON  1,893,222
PRESSURE INDICATOR
Filed Aug. 6, 1928

INVENTOR
Adelbert E. Bronson
BY
Lwis, Hudson & Kent
ATTORNEYS

Patented Jan. 3, 1933

1,893,222

UNITED STATES PATENT OFFICE

ADELBERT E. BRONSON, OF CLEVELAND, OHIO, ASSIGNOR TO THE DILL MANUFACTURING COMPANY, OF CLEVELAND, OHIO, A CORPORATION OF OHIO

PRESSURE INDICATOR

Application filed August 6, 1928. Serial No. 297,615.

The present invention relates to a gauge of a type and construction which is particularly adapted for use in connection with the valve stem of a pneumatic tire, although, as will be appreciated, its usefulness is not limited to its use in this connection.

One of the objects of the invention is to produce a gauge of the character described which is permanently attached to a valve stem with provision so that the tire may be inflated while the gauge is attached, and the gauge will register pressure of the air within the tire.

An additional object is to provide a gauge which may be readily manipulated at any time so as to indicate the pressure of air which is within the tire, even when the tire is not being inflated.

A further object is to produce a gauge in which the parts are ruggedly constructed so as not to get out of order.

Figure 1:
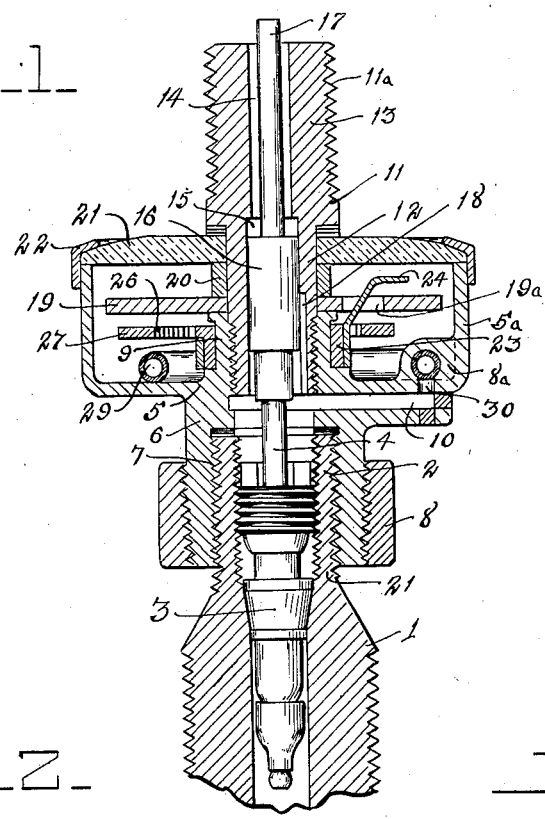
Figure 2:
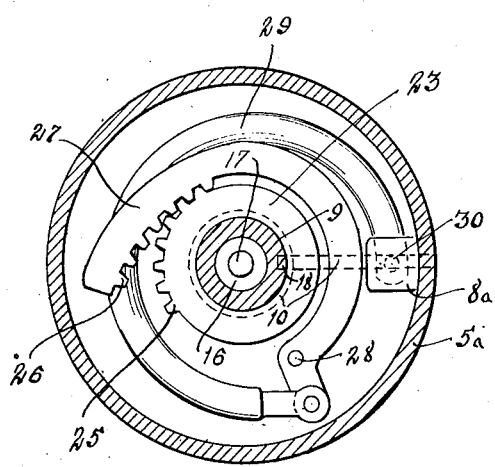
Figure 3:
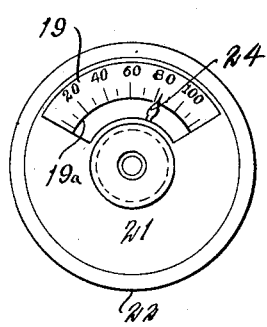

Reference should be had to the accompanying drawing forming a part of this specification, in which Fig. 1 is a sectional elevation of the tire gauge applied to a valve stem; Fig. 2 is a transverse section; and Fig. 3 is a top plan view of the dial and the indicator.

Referring to the drawing, 1 indicates a valve stem of usual construction which is provided with an upward extension 2 having reduced diameter which is threaded upon the outside.

Within the valve stem are the valve insides which are generally represented at 3 and may be of any desired construction. Such valve insides always provide an upwardly extending stem 4 which is depressed to unseat the valve at times when the tire is to be inflated or when it is desired to gauge the pressure of the air within the tire.

The foregoing are or may be structures which are at the present time well known in the art.

The gauge proper comprises a body portion 5 which has an extending projection 6, this projection being threaded upon the inside thereof, as indicated at 7, which adapts it to be threaded upon the extension 2 of the usual valve stem.

The outer wall of the casing is slightly tapered and is threaded and adapted for engagement with a collar 8 which is threaded upon its interior surface. The interior surface of the collar is slightly tapered so that when the collar 8 is rotated it tends to compress the extension 6 and so cause it to bind upon the valve stem, and prevents its coming loose.

The body portion 5 is provided with a cup-shaped portion indicated at 5ª which is open at its outer end and forms a casing for the pressure indicating mechanism. The body portion 5 also has a central stem 9 which is hollow and is threaded upon a portion at least of its interior surface. In the body portion there is also a duct 10 which extends transversely thereof and communicates with the air passage through the stem 9 and the lower extension 6. Cooperating with the stem 9 is a member 11 which has a lower extension 12, this extension being threaded at its lower end for engagement with the threads upon the interior of the stem 9. The upper portion of the member 11 is threaded upon its exterior surface as at 11ª, and is adapted to receive a closing cap, such for instance as a standard valve cap.

The member 11 has an interior bore, the upper portion of which is indicated at 14 and is of one diameter, while the portion 15 which is beyond the portion 14 is of enlarged diameter.

Within the enlarged portion 14 there is a sliding member which has a part 16 that is of substantially the same diameter as the portion 15 of the bore, but relative diameters are such that the member 16 may slide within the portion 15.

Extending upwardly from the part 16 is a stem 17 which is of such length that it normally protrudes beyond the end of the extension 11.

The lower end of the part 16 of the sliding member is adapted to engage with the upper end of the valve stem 4 so that depression of the part 16 will result in depressing the valve stem 4 to unseat the lower valve.

The extension 12 at a portion thereof below the top of the part 16 when the said part is in its normal position is provided with one or more grooves, such as indicated at 18, so positioned that when the part 16 is depressed a sufficient distance the groove 18 will be exposed and form a passage for the air.

When the member 16 is in its upward position, in which position it will be normally maintained by the upward pressure of the valve stem 4, the upper end of the groove 18 is covered, so that no air may escape beyond the part 16.

Within the cup-shaped portion 5ª of the body there is a dial 19 which has a central opening that surrounds the outer surface of the lower extension 12. Above the dial is a retaining member 20 which is engaged by a glass cover 21 which in turn is held in its position upon the cup-shaped member by means of a bezel 22 which is secured in any desired manner.

The dial plate 19 when secured in any given position is maintained in this position against rotation.

Mounted upon the central stem 9 and rotatable thereon is a collar 23. This collar carries a pointer which is indicated at 24, the pointer extending upwardly through a slotted opening 19ª in the dial 19, so that the outer end thereof is above the dial plate and the position of the pointer with respect to the dial plate may be observed through the glass cover 21.

The collar 23 has a portion thereof provided with gear teeth as indicated at 25 in Fig. 2, and these gear teeth are adapted to be engaged by teeth 26 carried by a rack member 27. This rack member is of curved form and is pivoted to the body 5 adjacent one end as indicated at 28.

The end of the rack member 27 is so designed that as it may move about its pivot the teeth 25 and 26 will mesh without binding. In other words, the contact between the gears 25 and 26 is substantially tangential with respect to the rotatable member 23.

Within the casing 5ª there is a Bourdon tube 29, one end of this Bourdon tube being secured to an arm of the pivoted rack member 27. The other end of the Bourdon tube is secured in a small housing 8ª which forms a part of the casing 5ª. In fact, it may be cast integral therewith. The end of the Bourdon tube 29 which is retained in the portion 8ª is open, and by means of a small duct 30 communicates with the passageway 10 which is formed in the body portion 5 of the gauge. Thus it will be seen that the open end of the Bourdon tube being at all times in communication with the passageway 10, will be subject to air pressure whenever there is air under pressure in the duct 10.

With a gauge such as described attached to a valve stem, if it be desired to inflate the tire, a pump hose with a suitable inflating nozzle may be attached to the end of the extension 11, which will depress the stem 17, which will also depress the valve inside stem 4, thus unseating the valve, and the enlarged portion 16 will be depressed sufficiently so as to uncover the grooves 18 so that air from the pump may pass directly through the valve stem 1 into the tire. During this operation the air under pressure communicates with the open end of the Bourdon tube, causing it to expand in a well known manner, which in turn causes movement of the rack member 27 and the member 23, which moves the pointer with respect to the dial 19, and so indicates the pressure of the air.

Thus it will be seen that the pressure of the air may be determined during the air filling operation.

In the event that it is desired to test the air pressure in the tires when a pump connection is not applied, it is only necessary to depress the stem 17 a slight distance, just sufficient to unseat the valve of the valve insides, but not sufficient to push the portion 16 so as to expose the grooves 18.

Under these conditions air may escape past the valve of the valve insides, fill the duct 10 and the Bourdon tube, which Bourdon tube will expand in accordance with the pressure of the air which is within the same and so move the pointer 24 with respect to the dial 19 and indicate the pressure of the air within the tire.

Having thus described my invention, I claim:

A gauge adapted to be mounted on the end of and concentrically with a valve stem having a valve insides therein, said gauge having a bore forming an air duct therethrough, a sliding member within said air duct, said bore having grooves in the wall thereof forming air passageways and adapted to be covered and uncovered by said sliding member, said sliding member normally closing said passageways and of a length such that a partial inward movement thereof unseats the valve of the valve insides without opening said passageways while further inward movement of said member uncovers said passageways, a pressure responsive device within the gauge having a portion communicating with said bore, a movable indicator within the gauge, and means connecting the pressure responsive device with the indicator to move the same.

In testimony whereof, I hereunto affix my signature.

ADELBERT E. BRONSON.